UNITED STATES PATENT OFFICE.

PIERRE LEPERS, OF LYON, FRANCE.

PROCESS OF SEPARATING METAXYLENE FROM XYLENE SUBSTANCES.

1,311,848. Specification of Letters Patent. Patented July 29, 1919.

No Drawing. Application filed April 23, 1919. Serial No. 292,161.

*To all whom it may concern:*

Be it known that I, PIERRE LEPERS, of Lyon, France, a citizen of the French Republic, have invented certain new and useful Improved Processes of Separating Metaxylene from Xylene Substances, of which the following is a specification.

The present invention has for its object a process of separation in the pure state of metaxylene, contained in the different xylene substances (raw xylenes, xylene spirits) by sulfonation of the metaxylene, by means of sulfuric acid of medium concentration in the presence of metaxylene sulfonic acid and desulfonation of the metaxylene sulfonic acid obtained.

Of the three isomeric xylenes, orthoxylene, metaxylene and paraxylene, metaxylene is the one of the greatest industrial value.

Crude xylene obtained by fractional distillation of the oils of tar contains the three isomeric xylenes in variable proportions. The xylene-spirits, obtained by rectification or Borneo petroleum also contain the three isomeric xylenes, accompanied by mechanic hydrocarbons.

Various process have been suggested for separating the metaxylene from its two isomeric substances and from the other bodies which accompany it.

It has long been known that if the mixture of xylenes is treated with ordinary sulfuric acid, at comparatively low temperatures, the metaxylene and orthoxylene are dissolved, the paraxylene not being attacked. It is also known that, if the mixture of sulfonic acids thus obtained is subjected to disulfonation, the metaxylene is desulfonated at 122° C., while in order to obtain all the orthoxylene the heat must be raised to 160° C. The process furnishes rather bad results because at 122° C. all the metaxylene is not obtained and between 122° and 160° C. mixed portions without value are obtained. Further, the desulfonation at 160° C. is not very easy to effect industrially.

It has also been proposed to allow the mixture of the two sulfonic acids and of residual sulfuric acid to stand, so that at the end of a certain time, varying with the temperature, the greater part of the metaxylene sulfonic acid crystallizes. These crystals can then be separated by drying or draining and the metaxylene regenerated by desulfonation. Here again the result is unsatisfactory, as the crystallization of the metaxylene sulfonic acid is not total, and some of the metaxylene and the orthoxylene and sulfuric acid of sulfonation is lost.

Now the process which forms the object of the invention is much more simple and more economical, because it is based on the sulfonation of the metaxylene exclusive of the orthoxylene and paraxylene whereby by desulfonation all the metaxylene is obtained, the sulfuric acid of sulfonation being regenerated.

Now, the desulfonation of metaxylene sulfonic acid not containing any orthoxylene sulfonic acid is an easy operation, because it is effected at a temperature easy to obtain with steam: this operation is complete: it is, moreover, very rapid.

The present process of sulfonation is based on the following observation: that none of the three xylenes are sulfonated at the medium temperatures (50° C.) by sulfuric acid of medium concentration (about 75% of $SO_4H_2$), but that, if sulfuric acid of a strength of about 75% and metaxylenesulfonic acid are made to act simultaneously on the mixture of the three xylenes, the metaxylene is sulfonated exclusive of the two others.

The metaxylene sulfonic acid is obtained by sulfonating pure metaxylene with ordinary sulfuric acid (at 66° Baumé). After sulfonation the surplus sulfuric acid is recovered in order to have a concentration of 75% of $SO_4H_2$.

If this base of metaxylene sulfonic acid is caused to act on the mixture of the three xylenes at a temperature of 50° C., it is found that only the metaxylene is sulfonated, but the sulfonation soon stops, because the power of the sulfuric acid decreases.

Therefore, in order to maintain the sulfonation, concentrated sulfuric acid must be continuously added so as to maintain the concentration of the free acid at about 75%.

The amount of acid to be added is regulated by the amount of metaxylene to be sulfonated after the reaction

$$C_8H_{10}+SO_4H_2=C_8H_9-SO_3H+H_2O.$$

During this operation the mass is to be kept in a state of brisk agitation.

The speed of supply of the concentrated sulfuric acid is regulated in accordance with the speed of sulfonation of the metaxylene, The operation can be effected in a continuous manner, that is to say, by supplying the metaxylene sulfonic acid and sulfuric acid with 75% of the amount of the regulated discharges of raw xylene or of xylene spirit and concentrated sulfuric acid, while continuously evacuating the product of the reaction.

Whatever the method of operation, the process allows of sulfonating 97 to 99% of the metaxylene contained in the xylene substance, while only sulfonating 0.5 to 1% of orthoxylene. By allowing the treated mass to rest it forms into two layers, the upper layer being formed of the non-sulfonated hydrocarbons and the lower layer of the metaxylene sulfonic acid and the surplus sulfuric acid which is available for desulfonation.

For the desulfonation one operates in the usual manner at a temperature of 130–135° C. with or without injection of steam. The metaxylene is rapidly and totally desulfonated and one obtains in pure metaxylene 94–95% of the metaxylene contained in the xylene substance. The regenerated sulfuric acid tests 48–52 Bé.

What I claim as my invention and desire to secure by Letters Patent of the United States is:—

A process of separating metaxylene contained in xylene substances consisting in sulfonating the metaxylene exclusive of the two other isomeric substances contained in said xylene substances, by means of sulfuric acid of a strength of about 75% of $SO_4H_2$ in the presence of metaxylene sulfonic acid, separating the metaxylene sulfonic acid thus produced from the unsulfonated isomeric xylenes and then desulfonating the metaxylene sulfonic acid obtained.

In witness whereof I have signed this specification in the presence of two witnesses.

PIERRE LEPERS.

Witnesses:
JEAN GERMAIN,
LUCIENNE BOUVERET.